United States Patent
Joyner et al.

(10) Patent No.: US 6,571,038 B1
(45) Date of Patent: May 27, 2003

(54) MULTIMODE INTERFERENCE COUPLER WITH TUNABLE POWER SPLITTING RATIOS AND METHOD OF TUNING

(75) Inventors: Charles H. Joyner, Red Bank, NJ (US); Juerg Leuthold, Eatontown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/516,295

(22) Filed: Mar. 1, 2000

(51) Int. Cl.[7] ............................................. G02B 6/26
(52) U.S. Cl. ........................ 385/40; 385/27; 385/39
(58) Field of Search ............................. 385/15, 27, 31, 385/39, 40

(56) References Cited

U.S. PATENT DOCUMENTS

| | | | | |
|---|---|---|---|---|
| 5,379,354 A | * | 1/1995 | Jenkins | 385/24 |
| 5,689,597 A | | 11/1997 | Besse | 385/39 |
| 5,933,554 A | | 8/1999 | Leuthold et al. | 385/28 |
| 6,047,096 A | * | 4/2000 | Augustsson | 385/37 |

FOREIGN PATENT DOCUMENTS

| | | | | |
|---|---|---|---|---|
| EP | 1 048 971 A1 | * | 11/2000 | G02F/1/065 |
| EP | 1 055 958 A1 | * | 11/2000 | G02F/1/065 |
| JP | 2001-183710 | * | 7/2001 | G02F/1/313 |

OTHER PUBLICATIONS

Saida et al. Silica–based 2x2 multimode interference coupler with arbitrary power splitting ratio, Electronics Letters, vol. 35 No. 23, Nov. 1999, pp 2031–2033.*

Leuthold et al. "All–Optical Space Switches with Gain and Principally Ideal Extinction Ratios" IEEE Journal of Quantum Electronics, vol. 34, No. 4, pp. 622–633, Apr. 1998.

Leuthold et al. "Multimode Interference Couplers for the Conversion and Combining of Zero– and First–Order Modes" Journal of Lightwave Technology, vol. 16, No. 7, pp. 1228–1239, Jul. 1998.

Nagai et al. "InGaAsP/InP Multi–Mode Interference Photonic Switches for Monolithic Photonic Integrated Circuits"Jpn. J. Appl.Phys. vol. 38, Part 1, No. 2B, pp. 1269–1272, Feb. 1999.

* cited by examiner

*Primary Examiner*—John D. Lee
*Assistant Examiner*—Sarah U Song
(74) *Attorney, Agent, or Firm*—Moser, Patterson & Sheridan L.L.P.

(57) ABSTRACT

A multimode interference coupler having a tunable power splitting ratio and a method of tuning the splitting ratio. The tuning of the power splitting ratio is achieved by varying an effective refractive index around a portion in a multimode interference section.

19 Claims, 4 Drawing Sheets

MULTIMODE INTERFERENCE COUPLER WITH TUNABLE POWER SPLITTING RATIOS AND METHOD OF TUNING

TECHNICAL FIELD

The invention relates to the field of integrated optics and, in particular, to a multimode interference coupler having a tunable power splitting ratio and a method of tuning the ratio of the coupler.

BACKGROUND OF THE INVENTION

Mode couplers are used extensively in integrated optics to split and combine light signals propagating through an optical waveguide structure. Different types of couplers are currently available—e.g., symmetrical Y branches, directional couplers, star couplers and multimode interference couplers. Multimode interference (MMI) couplers have advantages such as compactness, large optical bandwidth and large design tolerance. Once fabricated, however, a conventional MMI coupler offers only a fixed power splitting ratio. Modification of the MMI coupler's geometry is usually necessary in order to obtain different splitting ratios.

A mode coupler is often used in Mach-Zehnder electro-optic switches. When on/off ratios above 20 dB are desired in these electro-optic switches, it is desirable to have a mode coupler having a "tunable" power splitting ratio—i.e., variable splitting ratio without the need for physical modification of the mode coupler. In all-optical Mach-Zehnder type wavelength converters, a strong optical control pulse induces refractive index change in one arm of a Mach-Zehnder interferometer and allows switching of a data signal from one output arm to the other. However, the strong optical signal used to induce the phase-shift also modulates the intensity of the data signal to be controlled, resulting in a reduced extinction ratio. Asymmetric splitting ratios in the couplers are often required to attain ideal extinction ratios in order to compensate for the gain asymmetries from the carrier depletion in the semiconductor optical amplifiers.

SUMMARY OF THE INVENTION

The invention relates to a multimode interference coupler having a tunable power splitting ratio and a method of tuning the splitting ratio. The splitting ratio is tuned by varying an effective refractive index of at least a portion of the multimode interference coupler. The effective refractive index may be varied at some pre-determined locations of the coupler by supplying, for example, an electrical current, voltage or light to the specific locations of the coupler, resulting in tunability of the power splitting ratio of the coupler.

BRIEF DESCRIPTION OF THE DRAWINGS

The teachings of the present invention can readily be understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1A:
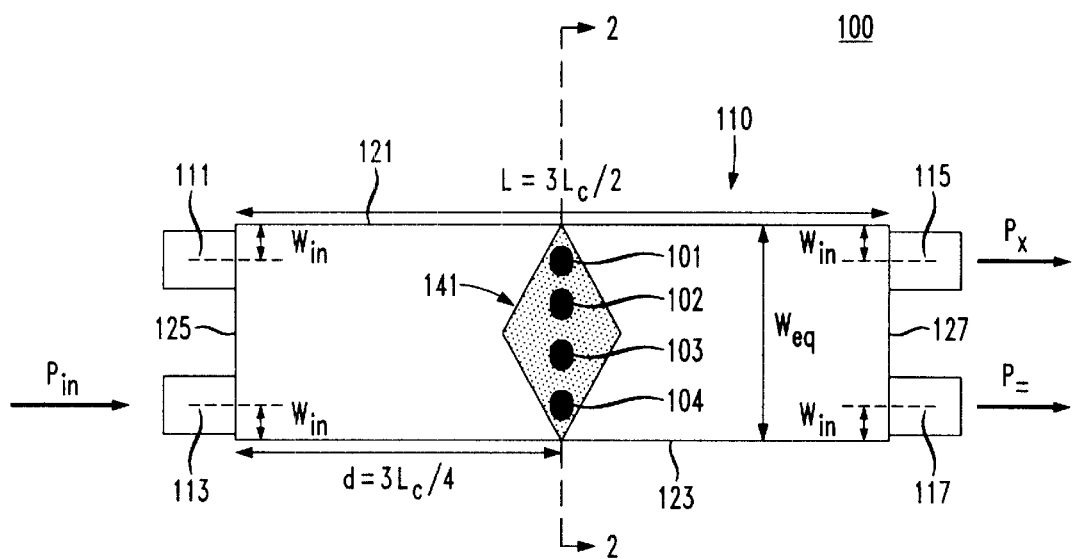
FIGS. 1a–d depict schematic illustrations of a tunable general 2×2 coupler according to several embodiments of the invention.

The present invention provides a multimode interference coupler (MMI) with a tunable power splitting ratio, and a method of tuning the ratio of the coupler. The power splitting ratio of the MMI coupler is tuned by varying an effective refractive index within a MMI section of the MMI coupler. (The effective refractive index is used to denote a "weighted average" of refractive indices of core and cladding materials as light propagates through a waveguide.) In particular, the effective refractive index is varied by applying a current, voltage or light to specific locations inside the MMI coupler.

Some basic principles of MMI are presented below to help in a better understanding of the invention. A multimode interference (MMI) coupler comprises of one or more input waveguides (a waveguide typically comprises a waveguide core surrounded by a cladding material that has a lower refractive index than the core material) that are coupled to a wider waveguide section (also called a MMI section), which is in turn coupled to one or more output waveguides. An MMI coupler allows one or more input signals to be split, combined and/or modified into one or more output-signals. It is understood that although the invention is used to provide a tunable splitting ratio of the coupler, the principle of the invention can also be applied to combining or modifying input signals in an MMI coupler.

The method of MMI exploits the phenomenon of self-imaging—that within an MMI, an input field is reproduced in single or multiple images at certain periodic intervals, or locations, along the propagation direction of the light. In the case of a rectangular shaped MMI, the locations at which a single or multiple image occurs (self-imaging locations) are represented by:

$$L = \left(\frac{M}{N}\right) 3L_c, \quad \text{where} \quad L_c = \frac{4\eta_{\text{eff}} W_{eq}^2}{3\lambda}$$

where M and N are positive integers without any common divisor, $\eta_{\text{eff}}$ denotes the effective refractive index, $\lambda$ the wavelength in vacuum, and $W_{eq}$ the equivalent MMI width, which is the geometrical width of the MMI including the penetration into the neighboring material of the waveguide. $L_c$ is also known as the coupling length. The occurrence of these multiple or single images may be displaced for MMI with bent, parabolically, linearly tapered or otherwise modified shape and also for three dimensional MMIs. The input and output waveguides may, for example, be connected perpendicularly or tilted against the input and output ends of the MMI.

According to the invention, the splitting ratio of a MMI is tuned by changing the effective refractive index at and around certain locations—the self-imaging locations, inside the MMI section. These locations are selected according to the self-imaging property in the MMI coupler, corresponding to locations where multiple images occur. By changing the effective refractive index of the material around some, but not all of the spots within an interval of the MMI section, the relative phase relations of the different images at the interval can be changed, resulting in the modification of the whole subsequent interference pattern. When the locations for tuning the effective refractive index are chosen properly, the splitting ratios of an MMI at the output can be tuned by tuning the effective refractive index. In the subsequent discussion, the reference to a location around one or more multiple images within which the effective refractive index is modified is meant to denote an area around such one or more of the self images.

Due to the Kramers Kronig relations, a refractive index change is usually related to an intensity change of the light. Often these intensity changes are small and can be neglected, but sometimes they may be desired.

Tunable MMI couplers in two or three dimensions can be obtained by modifying MMIs with fixed splitting ratios according to the embodiments of the invention.

To practice the invention, the locations in an existing MMI where multiple images appear are first identified. This can be accomplished, for example, by means of numerical methods that simulate light propagation in waveguides. Such numerical methods are, for example, the beam propagation method (BPM) or mode analysis (MA) method, among others. In the special case of rectangular shaped MMIs, the locations where multiple images occur are described, for example, by Leuthold et al. in "Multimode Interference Couplers for the Conversion and Combining of Zero- and First-Order Modes", J. Lightwave Tech., vol. 16, pp.1228–39, 1998, which is herein incorporated by reference.

Once these locations are identified, a set of images is selected such that by varying the effective refractive index around these locations of images, the output intensity ratios of the MMI coupler can be modified. The tunability of the splitting ratios as a function of refractive index changes can be tested with the above numerical methods, e.g., BPM or MA. Finally, in order to tune the effective refractive index only at these positions, the material around these locations has to be chosen, such that it allows tuning of the effective refractive index—e.g., by injection of a current, by applying a voltage or by injection of light. If the refractive index is tuned by applying a current to a nonlinear material, the layer on top of the waveguide has to be metallized around the locations, in order to allow injection of a current into the area of the waveguide where the effective refractive index change is desired.

Most 2×2 MMI couplers can be made tunable by modifying the effective refractive index around self-imaging locations at about half-way along the length of the MMI section. The effective refractive index changes are made such that the changes towards the center of the MMI are different from those towards the edge of the MMI.

Some specific cases are discussed below to further illustrate the concept of the invention.

1. Tunable General 2×2 Coupler

The tunable general 2×2 MMI coupler 100 of FIG. 1a–d is based on a general 2×2 MMI coupler. The notations and terminologies used in describing MMI couplers follow those disclosed by Leuthold et al., in "Multimode Interference Couplers for the Conversion and Combining of Zero- and First-Order Modes", J. Lightwave Tech., vol. 16, pp.1228–39, 1998, which is herein incorporated by reference in its entirety. The MMI coupler 100 comprises a MMI section 110, two input waveguides 111, 113 and two output waveguides 115, 117. Note that only one input waveguide—111 or 113, is needed if the MMI coupler 100 is used as a splitter. As illustrated in FIG. 1a, the MMI section 110, in its rectangular shaped form, comprises two sides 121 and 123 having a length $L=3L_c/2$, an input end 125 and an output end 127 having a width of $W_{eq}$. The centers of the two input waveguides 111, 113 are located at distances of $W_{in}$ from the respective sides 121, 123, where $W_{in}<W_{eq}/2$.

A light signal having an input power or intensity of $P_{in}$, for example, enters the MMI coupler 100 via the input waveguide 113, while two output signals having intensities of $P_-$ (bar output) and $P_x$ (cross output) exit the MMI coupler 100 via the output waveguides 115 and 117. The splitting ratio is given by $P_-/P_x$.

To practice the invention, four self images 101, 102, 103 and 104 located about half-way along the length of the MMI, (i.e., along the propagation direction of light) from the input end 125, are selected. In the case of the rectangular MMI of FIG. 1a, these images are located at a distance $d=3L_c/4$ from the input end 125. The splitting ratio can be tuned by varying the effective refractive index around, for example, the two outer spots 101, 104 or the two inner spots 102, 103 (also referred to as self-images). Alternatively, the effective refractive index may also be varied for all four spots 101, 102, 103 and 104—but to different degrees among the spots.

In order to vary the effective refractive index in the MMI section 110, the waveguide material on top of the guiding structure may be metallized and a current applied to the structure. The current changes the effective refractive index in the MMI section 110 beneath the metallization. In FIG. 1a, for example, the rhombic shaped area 141 may denote the metallization used for injecting a current to the corresponding location of the MMI section 110. Alternatively, changes in the effective refractive index may also be achieved by applying a voltage or supplying light to the desired locations. The MMI section 110 may be fabricated using different materials, including semiconducting materials or polymers, among others.

Figure 2:
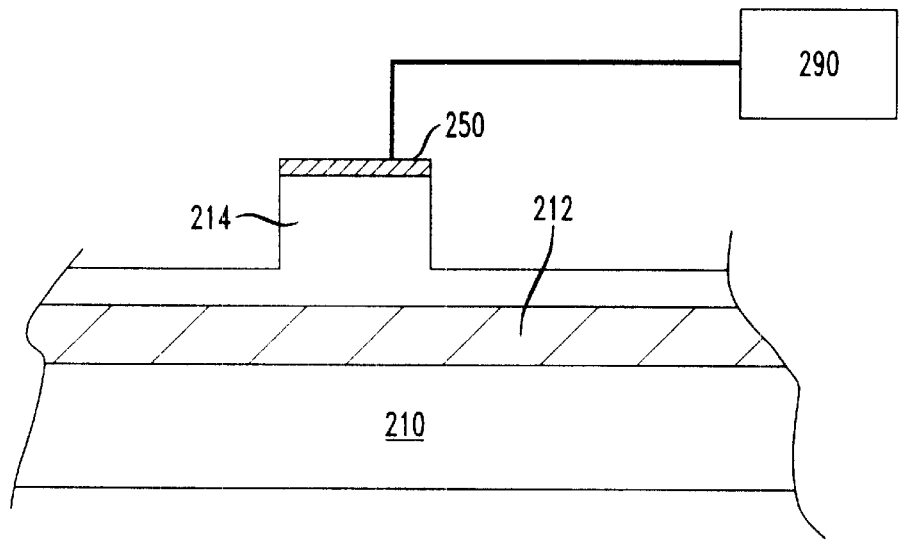
FIG. 2 depicts a schematic cross-sectional view of one embodiment of the invention.

FIG. 2 illustrates a schematic cross-sectional view of the MMI section 110 of FIG. 1a along a line 2—2. The MMI section 110 may comprise generally a waveguide layer 212 comprising a suitable material that is formed on a substrate 210, and a cladding layer 214 formed over the waveguide layer 212. The waveguide layer 212 typically has a refractive index that is higher than that of the surrounding cladding layer 214. The thickness of the various layers depend on the specific materials used in fabricating the MMI coupler 100. For example, the substrate 210 and cladding layer 214 may comprise indium phosphide (InP), while the waveguide layer 212 may comprise indium gallium arsenide phosphide (InGaAsP). The rhombic shaped area 141 is defined by an electrode or metal pad 250 provided on top of the MMI section 110. The electrode. 250, which may be made of various conducting materials, e.g., gold, is connected to an external current source 290, and the effective refractive index inside the MMI section 110 can be varied by injecting a current to the waveguide layer 212. Alternatively, the effective refractive index may also be tuned by applying a voltage to the electrode 250.

Figure 1B:
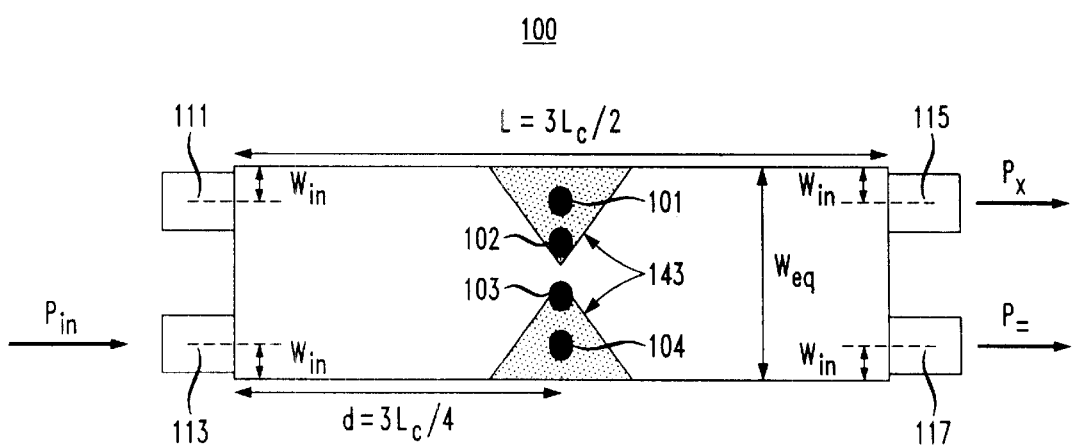
Figure 1C:
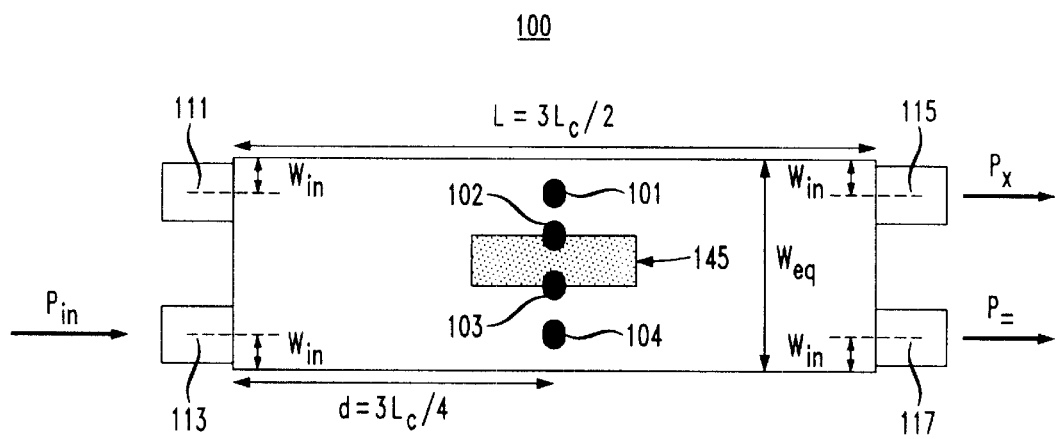
Figure 1D:
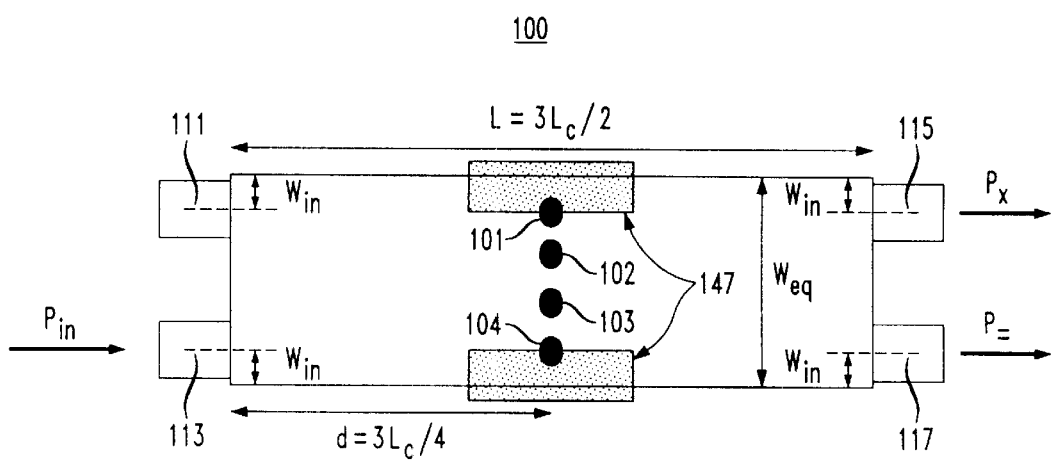

The metallization can be shaped in different manners—e.g., in a rhombic shape 141 (FIG. 1a), a butterfly shape 143 (FIG. 1b), a rectangular shape 145 (FIG. 1c) or only at the edges of the MMI section 110, as depicted by the rectangles 147 in FIG. 1d. In addition, it is possible to have other symmetrically shaped metallizations that lead to effective refractive index changes different from those shown in FIGS. 1a–d. Note that in general, different shapes of metallization can result in different degrees of refractive index tuning around various spots. For example, using the rhombic shape 141 of FIG. 1a, larger effective refractive index changes are obtained around the centrally-disposed self images 102 and 103 (due to the larger areas defined by the rhombus), compared to those obtained around the images 101 and 104 disposed towards the exterior of the MMI section 110.

The tuning range of a MMI coupler typically depends on how strong the effective refractive index change, the dimension around the spot where the effective refractive index change is induced, the materials and the manner by which the effective refractive index change is induced. In general, only a relatively small change in refractive index is required to obtain tuning of the power splitting ratio of the MMI coupler 100. For example, in a tunable general 2×2 MMI coupler (comprising, e.g., a 1.3 μm InGaAsP waveguide with an InP cladding layer) having a length of about 400 μm, about 10% tuning of the splitting ratio can be achieved by applying a current of about 20 milliamperes to a butterfly-shaped metal pad 250 with a maximum length (along the propagation direction) of about 30 μm. Aside from using current or voltage, the effective refractive index of the MMI section 110 can also be varied by using optical energy—e.g., by delivering sufficient light to the respective shaped areas 141, 143, 145 or 147 of the MMI section 110.

The form of the general 2×2 coupler does not necessarily have to be of rectangular shape. It can also be a butterfly or inverse butterfly geometry shaped MMI or of parabolically shaped one. Some of these other MMIs have been described by Besse et al., in "New 1×1 MMI couplers with Free Selection of Power Splitting Ratios", ECOC '94, pp.669–72, which is herein incorporated by reference in its entirety. In these cases, the coupling length has to be adapted accordingly, but the place where the effective refractive index change has to be induced does not change and the above cited metallization can apply as well if the current injection method is chosen to change the effective refractive index.

2. Tunable Overlap 2×2 Coupler

Figure 3:
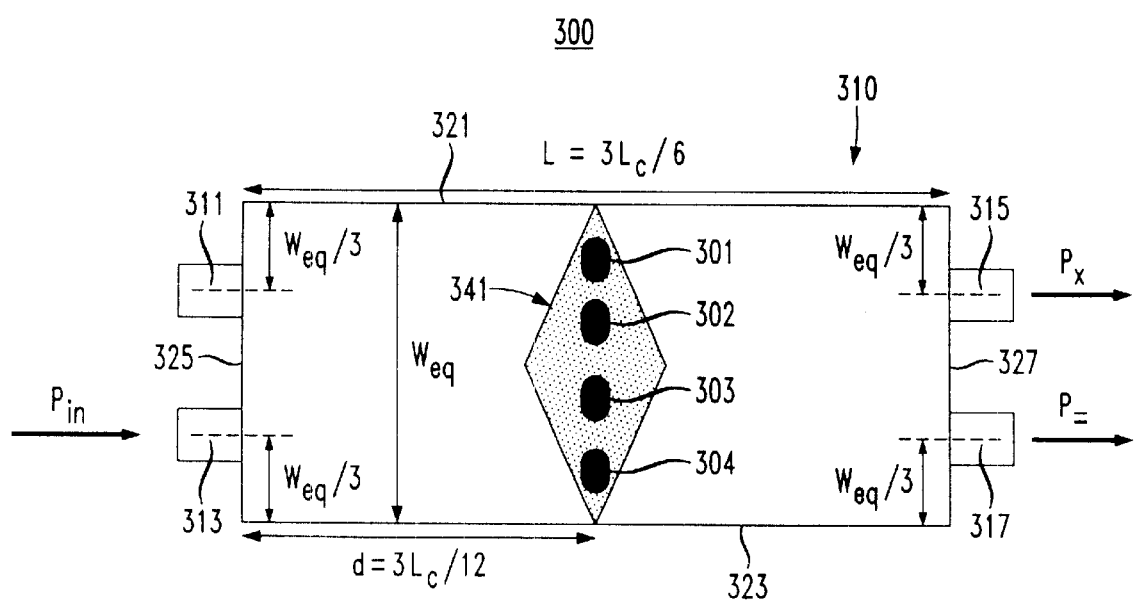
FIG. 3 depicts a schematic illustration of a tunable overlap 2×2 coupler according to one embodiment of the invention.

FIG. 3 illustrates schematically a tunable overlap 2×2 coupler 300, which is based on the overlap 2×2-MMI coupler. As illustrated in FIG. 3, the MMI section 310, in its rectangular shaped form, comprises two sides 321 and 323 having a length $L=3L_c/6$, an input end 325 and an output end 327 having a width of $W_{eq}$. The centers of the two input waveguides 311, 313 are located at distances of $W_{in}=W_{eq}/3$ from the respective sides 321, 323. Again, if the MMI coupler 100 is used as a splitter, then only one input waveguide is needed.

To practice the invention, four self images 301, 302, 303 and 304 located at about half-way along the length of the MMI section (e.g., around $d=3L_c/12$ for the rectangular coupler from the input end 325) are selected. The splitting ratio can be tuned by varying the effective refractive index around the two outer (exteriorly-disposed) spots 301, 304 or the two inner (centrally-disposed) spots 302, 303 (also referred to as self-images). Alternatively, the effective refractive index may also be varied for all four spots 301, 302, 303 and 304—but to different degrees among the spots, as illustrated by the use of the rhombic shape 341 in FIG. 3. Tuning of the splitting ratio can be achieved similarly to the above discussed tunable general 2×2 MMI and the tuning range is similar.

Although only the rhombic shape 341 is shown in FIG. 3, it is understood that other embodiments encompassing many other shapes such as those illustrated in FIG. 1b–d or previously discussed for the general 2×2 coupler, may also be used with the overlap 2×2 coupler 300 to achieve different tunability ranges for the splitting ratio.

Again, this MMI 300 does not necessarily have to be of rectangular shape. It can also be a butterfly, an inverse butterfly geometry shaped MMI, a parabolic shaped MMI, and so on, with coupling lengths adapted accordingly.

3. Tunable Overlap 1×1 Coupler

Figure 4:
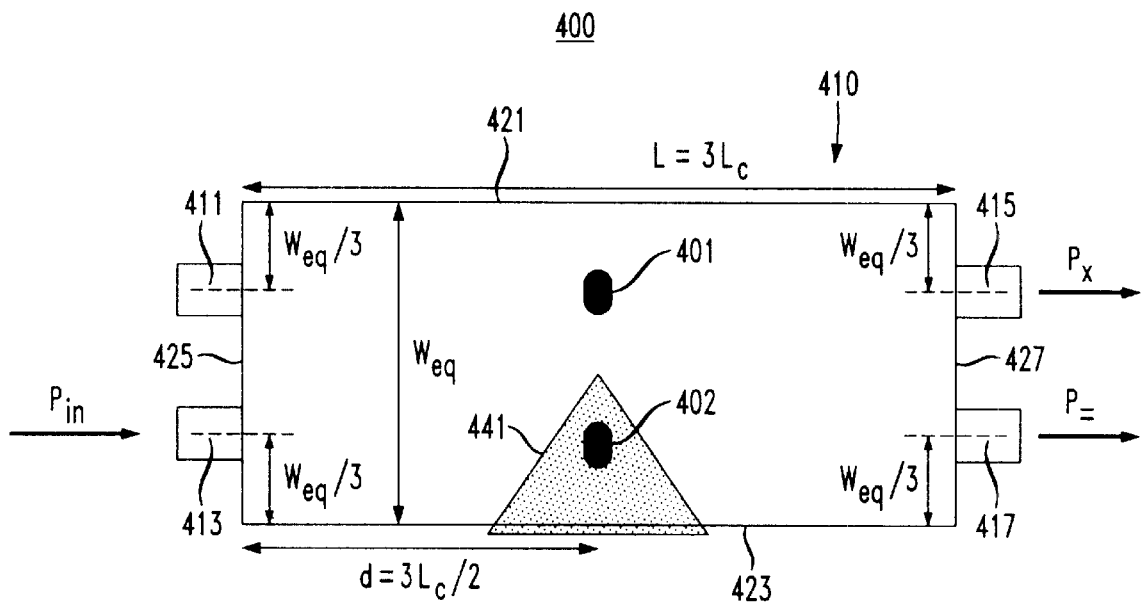
FIG. 4 depicts a schematic illustration of a tunable overlap 1×1 coupler according to one embodiment of the invention.

FIG. 4 illustrates schematically a tunable overlap 1×1 coupler 400. The MMI section 410, in its rectangular shaped form, comprises two sides 421 and 423 having a length $L=3L_c$, an input end 425 and an output end 427 having a width of $W_{eq}$. The centers of the two input waveguides 411, 413 are located at distances of $W_{in}=W_{eq}/3$ from the respective sides 421, 423. (Note that although this type of MMI coupler usually comes with one input waveguide, it is also possible to have the configuration illustrated in FIG. 4.) To practice the invention, two self images 401 and 402 located about half-way along the length of the MMI section (e.g., around $d=L_c/2$ from the input end 125 of the rectangular couplet), are selected. In the rectangular shaped form, 100% of the light is ordinarily coupled into the $P_x$ output waveguide 315. Tuning of the splitting ratio can be achieved by varying 10 the effective refractive index around either the spot 401 or spot 402 located midway between the input and the output ends 425, 427—e.g., using a triangular shape 441. Tuning of the effective refractive index around either of the selected spots 401, 402 will result in coupling of part of the light into the $P_-$ output port 417. Depending on the amount of effective refractive index change, tuning of the splitting ratios from about 100:0 to about 90:10 and higher can be obtained. It is understood that many other shapes may also be used to achieve different tuning results, and the one shown FIG. 4 is meant for illustrative purposes only.

Again, this MMI does not necessarily have to be of rectangular shape. It can also be an asymmetrically shaped MMI, a parabolically shaped MMI, and so on, with accordingly adapted coupling lengths.

4. Asymmetric Overlap 2×2 Coupler

Figure 5:
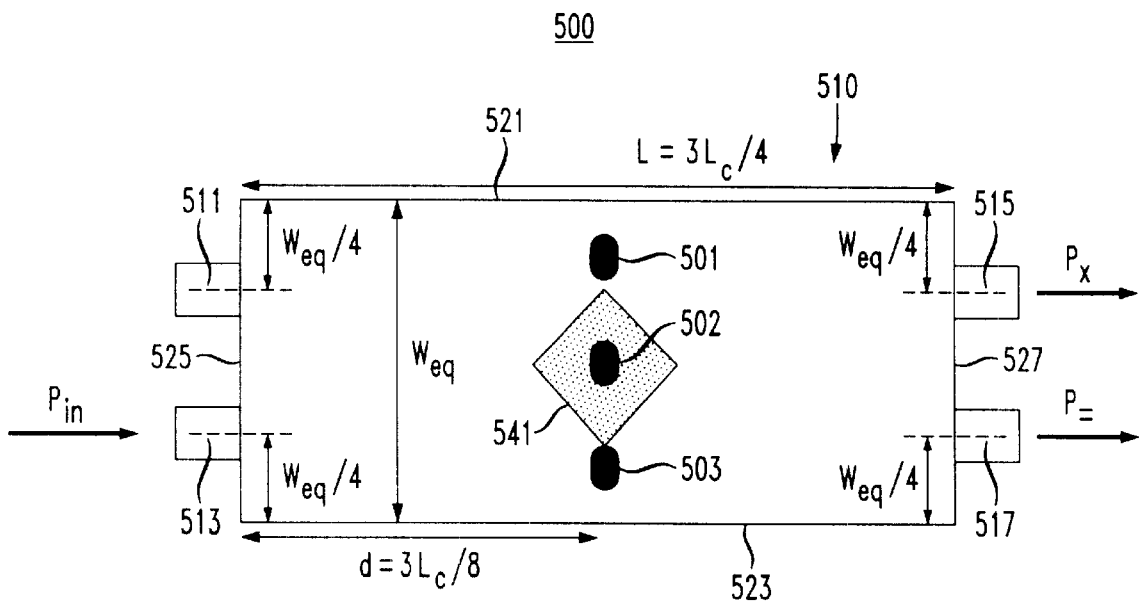
FIG. 5 depicts a schematic illustration of an asymmetric overlap 2×2 coupler according to one embodiment of the invention.

FIG. 5 illustrates schematically an asymmetric overlap 2×2 coupler 500. The MMI section 510, in its rectangular shaped form, comprises two sides 521 and 523 having a length $L=3L_c/4$, an input end 525 and an output end 527 having a width of $W_{eq}$. The centers of the two input waveguides 511, 513 are located at distances of $W_{in}=W_{eq}/4$ from the respective sides 521, 523. To practice the invention, for example, three self images 501, 502 and 503 located about half-way along the length of the MMI,section (e.g., around $d=3L_c/8$ from the input end 525 of the rectangular coupler), are selected. In the rectangular shaped form, 85% of the light is coupled into the $P_x$output waveguide 515 and 15% into the bar output port $P_-$ 517. The tuning of the splitting ratio can be obtained by tuning the effective refractive index around the two outer spots 501 and 503, or the one inner spot 502. For example, the tuning around the spot 502 using a square or rhombic shape 541 is illustrated in FIG. 5. Tuning of the splitting ratios can be achieved similarly to the above discussed tunable general 2×2 MMI, and other shapes can also be used to achieve different results.

Again, this MMI does not necessarily have to be of rectangular shape. It can also be a butterfly, an inverse butterfly geometry shaped MMI, a parabolic shaped MMI, and so on, with coupling lengths adapted accordingly.

Note that the examples of 2×2 and 1×1 MMI couplers disclosed here are meant for illustrative purposes only. The invention is generally applicable to a variety of MMI couplers, including general and overlap types comprising those with more than one or two inputs and outputs, e.g., 3×3, 4×4 and 5×5 MMI couplers. As previously mentioned, although the invention has been discussed with respect to splitters, it is also generally applicable to MMI couplers used as combiners, involving for example, two input and one output waveguides.

Although preferred embodiments which incorporate the teachings of the present invention have been shown and described in detail, those skilled in the art can readily devise many other varied embodiments that still incorporate these teachings.

What is claimed is:

1. A method of tuning a power splitting ratio of a multimode interference coupler, comprising the step of:
   altering the relative phase relations of the different images at at least one self-imaging location of the multimode interference coupler by varying an effective refractive index at said at least one self-imaging location.

2. The method of claim 1, wherein the effective refractive index is varied by supplying an electrical current to pre-determined locations of the multimode interference coupler.

3. The method of claim 2, wherein the predetermined locations are electrode(s) disposed around at least one self-imaging location in the multimode interference coupler.

4. The method of claim 1, wherein the effective refractive index is varied by supplying light to pre-determined locations of the multimode interference coupler.

5. The method of claim 4, wherein the predetermined locations are electrode(s) disposed around at least one self-imaging location in the multimode interference coupler.

6. The method of claim 1, wherein the effective refractive index is varied by supplying a voltage to pre-determined locations of the multimode interference coupler.

7. The method of claim 6, wherein the predetermined locations are electrode(s) disposed around at least one self-imaging location in the multimode interference coupler.

8. The method of claim 1, wherein the multimode interference coupler is a general 2×2 coupler comprising a multimode interference section; the at least one self-imaging location comprising at least one centrally-disposed self image and two exteriorly-disposed self images located at about half-way along a length of the multimode interference section; and the effective refractive index around at least one of the centrally-disposed self images is varied differently compared to the effective refractive Index around at least one of the exteriorly-disposed self images.

9. The method of claim 1, wherein said at least one self-imaging location comprises at least one centrally-disposed self image and two exteriorly-disposed self images located at about half-way along a length of the multimode interference section.

10. A multimode interference coupler having a tunable power splitting ratio, comprising:
    a multimode interference section having a light propagating layer characterized by an effective refractive index; and
    an electrode disposed adjacent to the multimode interference section for altering the relative phase relations of the different images at at least one self-imaging location of the multimode interference coupler by varying the effective refractive index of the light propagating layer when a signal is supplied to the electrode, wherein the electrode is disposed around said at least one self-imaging location in the multimode interference section.

11. The multimode interference coupler of claim 10, being further a general 2×2coupler, the at least one self-imaging location comprising at least one centrally-disposed self image and two exteriorly-disposed self images located at about half-way along a length of the multimode interference section; and the effective refractive index around at least one of the centrally-disposed self images is varied differently compared to the effective refractive index around at least one of the exteriorly disposed self images.

12. The multimode interference coupler of claim 10, wherein said electrode disposed around the at least one self-imaging location comprises a rhombic shape.

13. The multimode interference coupler of claim 10, wherein said electrode disposed around the at least one self-imaging location comprises a butterfly shape.

14. The multimode interference coupler of claim 10, wherein said electrode disposed around the at least one self-imaging location comprises a rectangular shape.

15. A multimode interference coupler having a tunable power splitting ratio, comprising:
    a multimode interference section characterized by an effective refractive index; and
    at least one pre-determined portion for supplying sufficient light to alter the relative phase relations of the different images at at least one self-imaging location of the multimode interference coupler by varying the effective refractive index at said at least one self-imaging location of the multimode interference section.

16. The multimode interference coupler of claim 15, being further a general 2×2 coupler, the at least one self-imaging location comprising at least one centrally-disposed self image and two exteriorly-disposed self images located at about half-way along a length of the multimode interference section; and the effective refractive index around at least one of the centrally-disposed self images is varied differently compared to the effective refractive index around at least one of the exteriorly-disposed self images.

17. A multimode interference coupler having a tunable power splitting ratio, comprising:
    a multimode interference section characterized by an effective refractive index; and
    means for altering the relative phase relations of the different images at at least one self-imaging location of the multimode interference coupler by varying the effective refractive index at said at least one self-imaging location of the multimode interference section.

18. The multimode interference coupler of claim 17, wherein the means for altering the relative phase relations comprises an electrode disposed over the at least one self-imaging location in the multimode interference section, and the electrode is connected to a current source.

19. The multimode interference coupler of claim 17, being further a general 2×2 coupler, the at least one self-imaging location comprising at least one centrally-disposed self image and two exteriorly-disposed self images located at about half-way along a length of the multimode interference section; and the effective refractive index around at least one of the centrally-disposed self images is varied differently compared to the effective refractive index around at least one of the exteriorly-disposed self images.

* * * * *